F. J. HEMM.
CLUTCH.
APPLICATION FILED SEPT. 17, 1915.

1,171,789. Patented Feb. 15, 1916.

WITNESSES
O. M. Kappler
Mary Gladwell

INVENTOR
Frank J. Hemm
BY Fay, Oberlin & Fay
ATTORNEYS

UNITED STATES PATENT OFFICE.

FRANK J. HEMM, OF PIQUA, OHIO.

CLUTCH.

1,171,789.  Specification of Letters Patent.  Patented Feb. 15, 1916.

Application filed September 17, 1915. Serial No. 51,166.

*To all whom it may concern:*

Be it known that I, FRANK J. HEMM, a citizen of the United States, and a resident of Piqua, county of Miami, and State of Ohio, have invented a new and useful Improvement in Clutches, of which the following is a specification, the principle of the invention being herein explained and the best mode in which I have contemplated applying that principle, so as to distinguish it from other inventions.

The subject of the present invention is an improvement in clutches of the cone or band type. In this form of clutch the male member is usually provided with a friction facing of leather or other fabric which engages with the female member of the cone. This facing, through lack of attention, often becomes hard, causing a grabbing action upon engagement and making the clutch hard to disengage. In my improved clutch, means are provided whereby the leather facing is raised above the male member at one or more points by springs, so that the clutch engages smoothly and without grabbing at all times.

Another object is to provide springs which can be maintained in position and yet be readily removable without the necessity of removing the facing.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
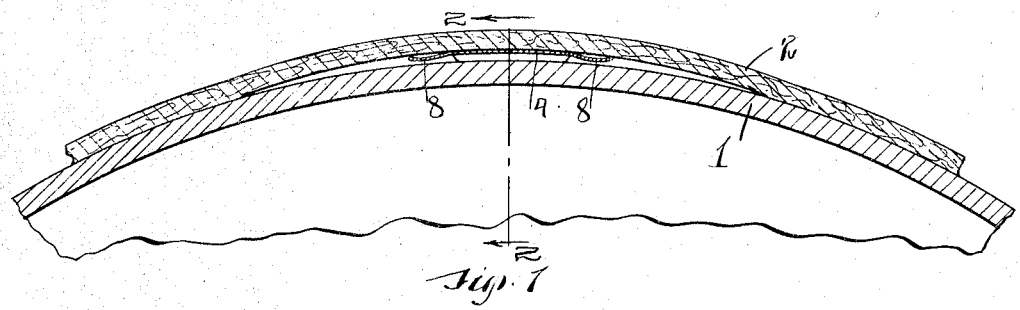
Figures 2, 3:
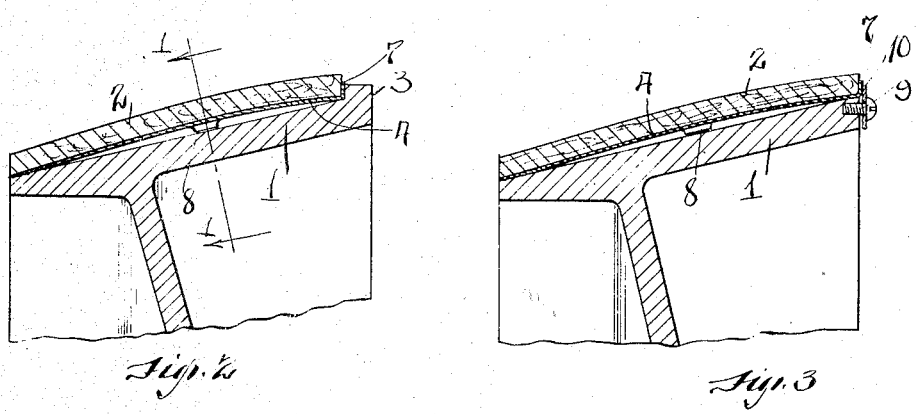
Figure 4:
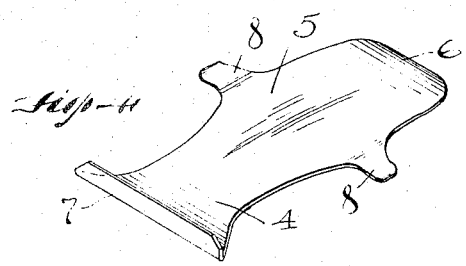
Figure 5:
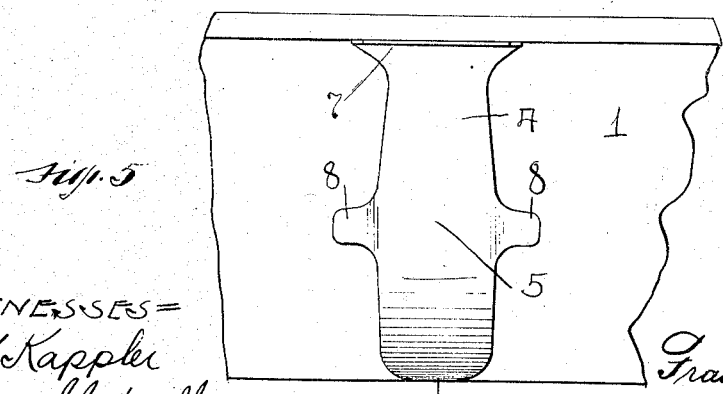

In said annexed drawing:—Figure 1 is a section on the line 1—1, Fig. 2, through a portion of a cone clutch showing a facing raised at one point by one of my improved springs; Fig. 2 is a transverse section taken on the line 2—2, Fig. 1; Fig. 3 is a view similar to Fig. 2, illustrating a modification in the construction; Fig. 4 is a perspective view of one of the improved springs; and Fig. 5 is a plan view of a portion of the clutch with the facing removed, showing the spring in position.

In Fig. 1 there is shown a portion of the male member 1, of a cone clutch provided with a facing 2, preferably of leather, the periphery of the clutch being provided at the rear edge with a raised flange 3, which assists in maintaining the facing in position. In some types of cone clutches this raised portion at the rear edge of the clutch member is omitted, and in Fig. 3 I have shown such a construction, which will be referred to hereinafter. It is desirable, in order to prevent grabbing of the clutch when engaged, to raise the leather facing band slightly, at several spaced points around its periphery, and for this purpose I employ an improved spring 4 which may be inserted between the leather band and the clutch member without dismantling the clutch, and when so inserted, will be locked into position against both twisting and transverse movement, while the friction of the band itself, on the spring, will prevent any circumferential movement. Each of these springs 4 comprises an arched portion 5 having one end 6, slightly tapered, and formed with the corners rounded to prevent the edge from cutting into the metal face of the member when compressed. At the other end this spring is provided with a turned-up edge portion or flange 7, which is adapted to contact against the edge of the leather band on one side, and on the other side to contact with the projection or flange 3 on the clutch member 1. This flange 7 is thus locked between the leather band, which is held in place usually by rivets on the clutch member, and the flange 3 on the clutch, and the spring is thus prevented from turning or from movement in a transverse direction across the clutch.

The spring 4 is also provided with two oppositely directed arched spring arms 8, which are slightly turned-up at their outer ends to prevent them from cutting into the face of the clutch member, and it will be noticed that these arms 8 do not normally contact the surface of the clutch as do the ends of the main spring portion 4. It is only when the spring has been compressed or flattened out to a certain extent, that these arms 8 contact the surface of the clutch, and thus the spring under compression presents a much firmer support to the band than is possible with a spring having but two arms, and also gradually increases the resistance to compression offered by the spring.

It will be noticed that the spring member 4, is of greater width at the center than at either end, and it is additionally stiffened at this point by reason of the lateral arms 8. The result of this construction is that when the spring is compressed, it bends adjacent to its two ends rather than in the middle, and the central portion is correspondingly slightly flattened to present a continuously greater area to the leather band than is possible in the ordinary longitudinally disposed spring which is used to some extent in cone clutches.

In Fig. 3 there is shown a clutch member 1, having a smooth face, and in such a construction I provide a screw 9, which is inserted in the edge of the clutch after the spring has been positioned, and is provided with a flange or a washer 10, one side of which will extend past the edge of the clutch member, and will serve as a retaining flange or stop for the spring 4, in exactly the same manner as does the permanent flange 3, which is shown on the clutch member in Figs. 1 and 2, and which is the commoner construction.

As illustrated in the drawings, only a single spring is shown but it is to be understood that two or more will be used around the periphery of the clutch so that there will be corresponding raised portions which will engage with the female member first, when the clutch is allowed to take hold giving the smooth action desired. The tapered rounded ends of the spring and the arms allow these portions to slide along the face of the male member as the clutch is engaged, thus preventing the spring from breaking or cutting the face of the member.

The present construction has the advantage of being adaptable to any cone clutch provided with a leather facing band, and may be inserted in such a clutch without removing any portion of the same. Similarly it can be removed in case it is worn out, without taking off the band, by merely prying up the flange 7, and pulling it from beneath the band. By placing the springs transversely, it is possible to secure a much smoother and stronger action on the leather band, and it has been found that three of the present springs inserted at equal intervals around the periphery of the clutch will operate as efficiently as a continuous series of flat arched springs when placed circumferentially end to end. By reason of the lateral arms which engage only when the spring has been compressed to a certain extent, the action of the springs when the clutch is engaged, is very much stronger than it is possible to secure by the usual arched spring used in such a clutch.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a clutch, the combination with a clutch member having a circumferential flange along one edge, and a facing for said member, of a flat curved spring adapted to be inserted transversely between said member and such facing and having a flange thereon adapted to engage between such facing and such flange on said member to retain said spring in position.

2. In a clutch, the combination with a clutch member having a removable circumferential stop along one edge and a facing for said member, of a flat curved spring adapted to be inserted transversely between said member and such facing and having a flange thereon adapted to engage between such facing and such flange on said member to retain said spring in position.

3. In a clutch, the combination with a clutch member and facing therefor, of a spring adapted to be mounted on said member beneath said facing, said spring comprising a flat curved spring extending transversely of said member, and said spring being slightly flattened at its center.

4. In a clutch, the combination with a clutch member and a facing therefor, of a spring adapted to be mounted on said member beneath said facing, said spring comprising a flat curved spring extending transversely of said member, said spring being broader at its center than at its ends and being flattened at such broader portion.

5. In a clutch, the combination with a clutch member and a facing therefor, of a spring adapted to be mounted on said member beneath said facing, said spring comprising a flat curved spring extending transversely of said member, said spring being provided with lateral extensions adapted to contact said member after compression of said spring.

6. In a clutch, the combination with a clutch member and a facing therefor, of a spring adapted to be mounted on said member beneath said facing, said spring comprising a flat curved spring extending transversely of said member, said spring being provided with lateral extensions having upturned ends and adapted to contact said member after compression of said spring to a certain extent.

Signed by me, this 11 day of Sept., 1915.

FRANK J. HEMM.

Attested by—
HORACE B. FAY,
D. T. DAVIES.